Patented Sept. 26, 1922.

1,430,449

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

METHOD OF PREPARING ALUMINUM-CHLORIDE CRYSTALS.

No Drawing.    Application filed March 6, 1922.   Serial No. 541,573.

*To all whom it may concern:*

Be it known that I, HENRY HOWARD, a citizen of the United States, residing at Cleveland, in the county of Cuyahoga and State of Ohio, have invented certain new and useful Improvements in Methods of Preparing Aluminum-Chloride Crystals, of which the following is a specification.

The invention relates to the production of cyrstalline aluminum chloride, and comprises a novel method of preparing the crystals whereby the same are freed from the contaminating acid which adheres to the surfaces of the crystals upon separation from the mother-liquor.

Aluminum chloride solution, produced for example by dissolving aluminum hydrate in muriatic acid, cannot be evaporated to form the anhydrous aluminum chloride since on heating it splits up into $Al_2O_3$ and HCl. The aqueous solution can, however, be concentrated to a point where a crystalline product containing water of crystallization will be produced, corresponding to the formula $Al_2Cl_6.12H_2O$, and a small tonnage of this material is produced in order to save freight. Heretofore, however, it has been quite difficult to produce this salt owing to the difficulty in finding apparatus which will resist the action of boiling aluminum chloride solution. Enameled iron has only a short life. Duriron withstands the corrosive action better but is gradually dissolved and contaminates the crystals with iron, imparting to them an undesirable greenish color.

The improvement which is the subject of the present application is based in part on the fact that aluminum chloride crystals are nearly insoluble in hydrochloric acid. In carrying out the invention I proceed substantially as follows:

A solution of aluminum chloride, as strong as possible, is first made, as by dissolving hydrate of alumina in concentrated muriatic acid. This will give a solution of 35° Bé. or even stronger. This solution, after settling or filtering, is saturated with hydrochloric acid gas which is readily absorbed and which causes the aluminum chloride to separate out in pure crystals.

The gas is preferably passed in until the supernatant liquor has an acidity of from 30 to 35 per cent HCl; in other words so that it will make a suitable acid for dissolving fresh portions of the hydrate of alumina, as will appear later on. Under these conditions over 80 per cent of the aluminum chloride originally present in the solution will be separated out as aluminum chloride srystals. The entire mass of crystals and liquor is then run onto a filter to separate the crystals. The filtrate, which is essentially muriatic acid, is then used for dissolving fresh portions of the aluminum hydrate, which provides the solution for a further operation.

The crystals recovered in the filter, which is preferably a covered tank having a false bottom of filtros tile, are contaminated with hydrochloric acid which clings to the crystals. This acid cannot be removed with water without dissolving the aluminum chloride crystals, but I have found that it is quite possible and highly practicable to neutralize the adhering acid, preferably by washing the crystals with a basic solution of aluminum chloride. For assisting in this operation I prefer to have the filter tank provided with a stirrer. A strongly basic concentrated solution of aluminum chloride is introduced and the stirrer started; the bottom outlet of the filter tank being closed of course. The entire mass of crystals is thus brought into suspension as a slurry in the basic aluminum chloride solution.

The basic aluminum chloride solution may be made in either of the well-known ways. Thus it may be prepared by partially neutralizing the hydrochloric acid of aluminum chloride with sodium carbonate which still leaves the alumina in solution; or, as in certain successful operations I have carried out, it may be produced by dissolving an excess of aluminum hydrate in aluminum chloride. It is obviously preferable to use the second method as contamination of the solution of aluminum chloride is thereby avoided.

In the crystal washing step scarcely any of the precipitated salts are dissolved. The free acid attached to the crystals is however instantly removed by combining with the basic alumina. The slurry is then run from the filter tank into a suitable rubber-lined centrifugal machine, which separates the neutral liquor from the neutral salts, leaving them white, nearly dry and ready to be packed for the market.

The liquid effluent from the centrifugal machine is preferably used for saturating with hydrochloric acid gas in the next operation. This completes the cycle.

It is to be understood that certain of the steps described may be modified or in some instances even omitted without departing from the scope of my invention; and that the latter is not restricted to the precise sequence of steps described or to the details of manipulation, except as contemplated by the appended claims.

I claim:

1. The method of preparing crystals of aluminum chloride which comprises introducing hydrochloric acid gas into a concentrated solution of aluminum chloride, and freeing the precipitated crystals from adhering acid by washing with basic aluminum chloride solution.

2. The method of preparing crystals of aluminum chloride which comprises saturating a concentrated solution of aluminum chloride with hydrochloric acid gas, and freeing the precipitated crystals from adhering acid by washing with basic aluminum chloride solution.

3. The method of preparing crystals of aluminum chloride which comprises precipitating crystalline aluminum chloride from a concentrated solution thereof by means of hydrochloric acid, separating the crystals from the mother-liquor, and freeing the crystals from adhering acid by washing with basic aluminum chloride solution.

4. The method of preparing crystals of aluminum chloride which comprises precipitating crystalline aluminum chloride from a concentrated solution thereof by means of hydrochloric acid, separating the crystals from the mother-liquor, forming a slurry of the crystals with basic aluminum chloride solution and agitating such slurry, to free the crystals from adhering acid, and separating the crystalline product from the liquor.

5. The method of producing crystals of aluminum chloride which comprises preparing a solution of aluminum chloride of substantially not less than 35° Bé. concentration, introducing hydrochloric acid gas into the solution and thereby precipitating aluminum chloride in crystalline form, until the supernatant liquor has an acidity of about 30 to 35 per cent, separating the crystals from the mother-liquor, and freeing the crystals from adhering acid by washing with basic aluminum chloride solution.

6. The method of preparing crystals of aluminum chloride which comprises dissolving hydrate of alumina in muriatic acid to produce a concentrated solution of aluminum chloride, introducing hydrochloric acid gas into the solution and thereby precipitating aluminum chloride in crystalline form, separating the crystals from the mother-liquor and utilizing the latter to dissolve fresh portions of hydrate of alumina, freeing the crystals from adhering acid by washing with basic aluminum chloride solution, separating the crystalline product from the liquor, and utilizing the latter for precipitation of further portions of crystals by treatment with hydrochloric acid.

In testimony whereof, I affix my signature.

HENRY HOWARD.